(12) United States Patent
Morise et al.

(10) Patent No.: US 7,010,911 B2
(45) Date of Patent: Mar. 14, 2006

(54) FLUID PRESSURE CONTROL CIRCUIT

(75) Inventors: Masaru Morise, Nukata-gun (JP); Hideki Miyata, Okazaki (JP); Akio Sugawara, Toyota (JP); Yuji Yasuda, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 32 days.

(21) Appl. No.: 10/821,887

(22) Filed: Apr. 12, 2004

(65) Prior Publication Data

US 2004/0206076 A1    Oct. 21, 2004

(30) Foreign Application Priority Data

Apr. 21, 2003    (JP) .............................. 2003-116258

(51) Int. Cl.
  *F16H 61/00*    (2006.01)

(52) U.S. Cl. .............................. 60/422; 60/450; 91/433

(58) Field of Classification Search ................ 60/422, 60/450, 459; 91/433, 468

See application file for complete search history.

(56) References Cited

U.S. PATENT DOCUMENTS 4,685,295 A * 8/1987 Christiansen et al. ......... 60/459
5,056,311 A * 10/1991 Tischer ........................ 60/422

FOREIGN PATENT DOCUMENTS

| JP | 5-196125 | 8/1993 |
| JP | 5-196127 | 8/1993 |
| JP | 8-178049 | 7/1996 |

* cited by examiner

*Primary Examiner*—Thomas E. Lazo
(74) *Attorney, Agent, or Firm*—Oblon, Spivak, McClelland, Maier & Neustadt, P.C.

(57) ABSTRACT

A fluid pressure control circuit includes a fluid pressure device which is operated by a fluid pressure; a control valve which is connected to the fluid pressure device via a connecting passage, and which changes a flow rate of predetermined fluid that is to be supplied to the fluid pressure device or that is to be discharged from the fluid pressure device according to a position of a valve element; and a pressure difference reflecting device which moves the valve element based on a difference in the fluid pressure between predetermined two different portions in the connecting passage and which changes the flow rate of the fluid that is to be supplied or to be discharged through the control valve according to the fluid pressure difference. With this fluid pressure control circuit, it is possible to obtain excellent responsiveness during supply/discharge of the fluid, change in the fluid pressure or the like, without increasing the amount of the fluid to be consumed.

20 Claims, 6 Drawing Sheets

FIG.2

| POSITION | | CLUTCHES AND BRAKES | | | | | | | O.W.C. | |
|---|---|---|---|---|---|---|---|---|---|---|
| | | C1 | C0 | C2 | B1 | B2 | C3 | B3 | F1 | F2 |
| N,P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

FLUID PRESSURE CONTROL CIRCUIT

INCORPORATION BY REFERENCE

The disclosure of Japanese Patent Application No. 2003-116258 filed on Apr. 21, 2003 including the specification, drawings and abstract is incorporated herein by reference in its entirety.

BACKGROUND OF THE INVENTION

1. Field of the Invention

The invention relates to a fluid pressure control circuit. More particularly, the invention relates to a technology for enhancing performance of supplying fluid to/discharging fluid from a fluid pressure device.

2. Description of the Related Art

A fluid pressure control circuit, which includes (a) a fluid pressure device that is operated by a fluid pressure, and (b) a control valve that is connected to the fluid pressure device via a connecting passage, and that changes a rate of flow (hereinafter, referred to as a "flow rate") of predetermined fluid which is to be supplied to the fluid pressure device or which is to be discharged from the fluid pressure device according to a position of a valve element, is used in, for example, a transmission for a vehicle. A hydraulic pressure control circuit disclosed in Japanese Patent Laid-Open Publication No. 05-196127 is an example of the above-mentioned fluid pressure control circuit. In a control valve of the hydraulic pressure control circuit, a valve element, to which the fluid pressure in a connecting passage is applied via a feedback passage that branches off from the connecting passage, is moved according to a balance between the fluid pressure and a predetermined pressure regulating load. The control valve includes a supply port through which the fluid is supplied from an oil pump or the like, a discharge port through which the fluid is discharged, and a communication port to which the connecting passage is connected. The state of communication (hereinafter, referred to as a "communication state") among the supply port, the discharge port and the communication port is continuously changed according to the position of the valve element, whereby the flow rate of the fluid to be supplied is controlled.

In such a fluid pressure control circuit, the fluid pressure to be applied to the valve element via the feedback passage does not always reflect the fluid pressure in the fluid pressure device due to resistance generated during circulation of the fluid in the connecting passage (hereinafter, referred to as "circulation resistance of the connecting passage) or the like, when the fluid is being supplied/discharged or the fluid pressure is being changed (hereinafter, referrer to as "during supply/discharge of the fluid or change in the fluid pressure"). Therefore, the flow rate of the fluid which circulates through the control valve is decreased, which makes it difficult to obtain sufficient responsiveness. When such a fluid pressure control circuit is applied, for example, to a fluid pressure device for a transmission (e.g. hydraulic friction engaging device), it is necessary to supply/discharge the fluid promptly during shifting, in order to obtain predetermined shifting responsiveness. Therefore, by increasing the diameter of the valve or by decreasing the valve overlap amount, the cross sectional area of a portion through which the fluid actually circulates in the supply port (hereinafter, referred to as a "circulation cross sectional area of the supply port, the same can be applied to the other ports"), the circulation cross sectional area of the discharge port and the circulation cross sectional area of the communication port are increased. In this case, however, there is a problem that, since the flow rate of the fluid which leaks from the discharge port is also increased, the amount of the fluid to be consumed is increased, which makes it necessary to increase the discharge capacity of the fluid pressure supply source such as an oil pump.

SUMMARY OF THE INVENTION

The invention is made in the light of the above-mentioned circumstances. According to an aspect of the invention, there is provided a fluid pressure control circuit including a fluid pressure device which is operated by a fluid pressure; a control valve which is connected to the fluid pressure device via a connecting passage, and which changes a flow rate of predetermined fluid that is to be supplied to the fluid pressure device or that is to be discharged from the fluid pressure device according to a position of a valve element; and a pressure difference reflecting device which moves the valve element based on a difference in the fluid pressure between predetermined two different portions in the connecting passage and which changes the flow rate of the fluid that is to be supplied or discharged through the control valve according to the difference in the fluid pressure (hereinafter, referred to as the "fluid pressure difference" where appropriate).

In the above-mentioned fluid pressure control circuit, the circulation state of the fluid during supply/discharge of the fluid or change in the fluid pressure is detected, based on the fluid pressure difference between the predetermined two different portions in the connecting passage. By moving the valve element of the control valve based on the circulation state of the fluid, that is, the fluid pressure difference, the flow rate of the fluid which circulates through the control valve is changed. Thus, flexibility in the flow rate control by the control valve is enhanced without increasing the amount of the fluid to be consumed. For example, when the valve element is moved such that the flow rate increases according to the fluid pressure difference, it is possible to enhance the responsiveness during supply/discharge of the fluid or change in the fluid, without increasing the amount of the fluid to be consumed.

According to another aspect of the invention, there is provided a fluid pressure control circuit including the following elements. The fluid pressure control circuit includes a fluid pressure device which is operated by a fluid pressure; a control valve which is connected to the fluid pressure device via a connecting passage, which supplies predetermined fluid to the fluid pressure device or discharges the fluid from the fluid pressure device, and which controls the fluid pressure in the connecting passage according to a predetermined pressure regulating load by changing the flow rate of the fluid to be supplied or discharged, the flow rate of the fluid being changed according to movement of a valve element to which the fluid pressure in the connecting passage is applied via a feedback passage that branches off from the connecting passage, the movement of the valve element being determined based on a relationship between the fluid pressure and the predetermined pressure regulating load; and a pressure difference reflecting device which applies a pressure difference load corresponding to a fluid pressure difference between the predetermined two different portions in the connecting passage and which changes the flow rate of the fluid that is to be supplied or to be discharged through the control valve according to the fluid pressure difference.

With the above-mentioned fluid pressure control circuit, the fluid pressure in the connecting passage is applied to the valve element of the control valve via the feedback passage, and the flow rate of the fluid is changed by moving the valve element according to the relationship between the fluid pressure and the pressure regulating load. The circulation state of the fluid during supply/discharge of the fluid or change in the fluid pressure is detected based on the fluid pressure difference between the predetermined two different portions in the connecting passage. By applying the pressure difference load corresponding to the circulation state of the fluid, that is, the fluid pressure difference to the valve element, the flow rate of the fluid which circulates through the control valve is changed. Thus, flexibility in the flow rate control by the control valve is enhanced without increasing the amount of the fluid to be consumed. For example, when the valve element is moved such that the flow rate increases according to the fluid pressure difference, it is possible to enhance the responsiveness during supply/discharge of the fluid or change in the fluid pressure, without increasing the amount of the fluid to be consumed.

BRIEF DESCRIPTION OF THE DRAWINGS

The above-mentioned and other objects, features, advantages, technical and industrial significance of the invention will be better understood by reading the following detailed description of preferred embodiments of the invention, when considered I connection with the accompanying drawings, in which

FIG. 2 is a table showing engaged/disengaged states of clutches and engaged/disengaged states of brakes for achieving each shift speed of an automatic transmission in FIG. 1;

DETAILED DESCRIPTION OF THE PREFERRED EMBODIMENTS

Figure 1:
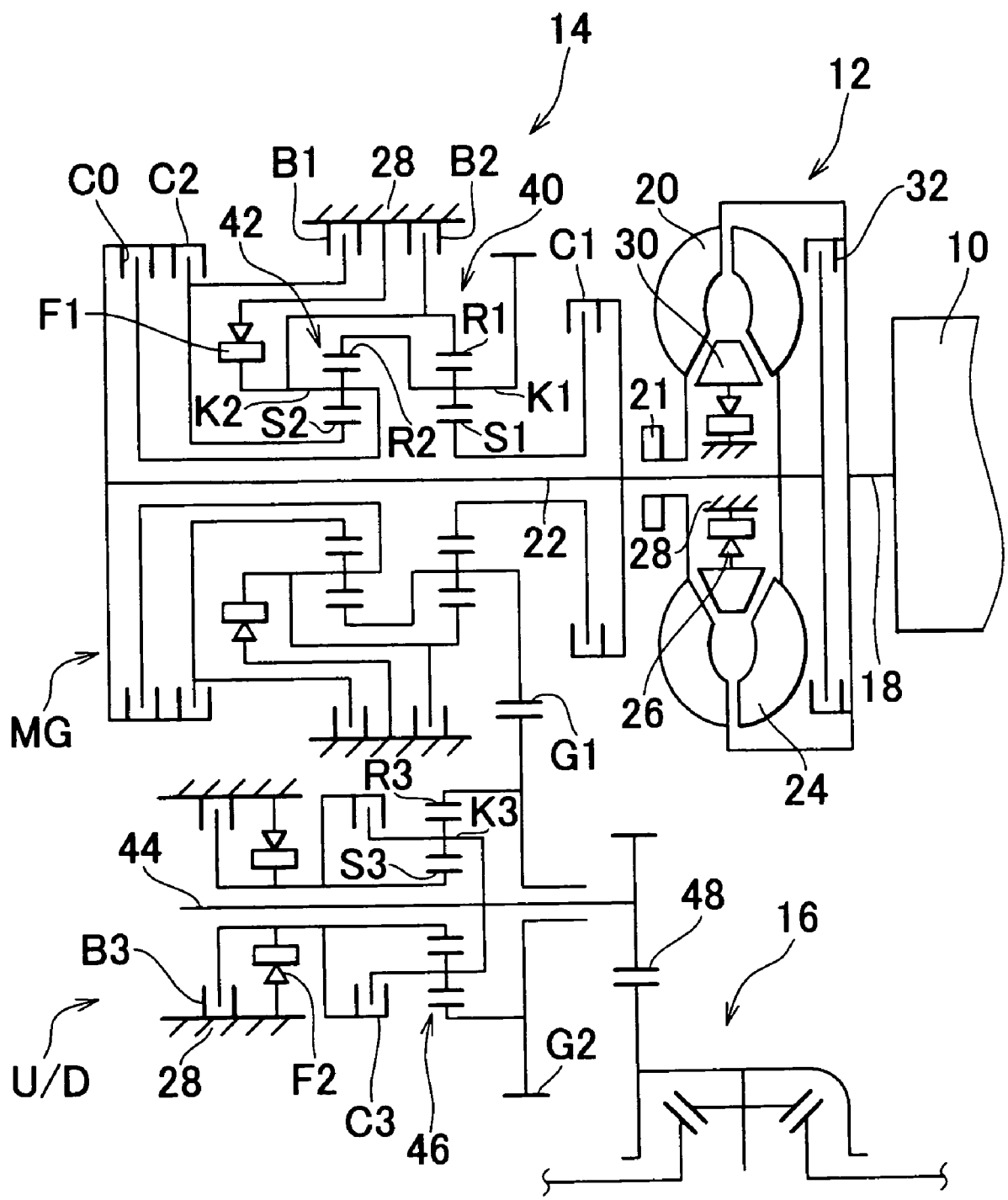
FIG. 1 is a view schematically showing a configuration of a drive-train unit for a vehicle, to which an exemplary embodiment of the invention is applied.

In the following description and the accompanying drawings, the present invention will be described in more detail with reference to exemplary embodiments. First, a first embodiment of the invention will be described in detail. FIG. 1 is a view schematically showing a transverse drive-train unit for a vehicle such as a FF (front engine-front drive) vehicle. The output from an engine 10, such as a gasoline engine, which generates power due to combustion of fuel is transmitted to drive wheels (front wheels) (not shown) via a torque converter 12, an automatic transmission 14 and a differential gear unit 16. The torque converter 12 includes a pump impeller 20 which is coupled to a crank shaft 18 of the engine 10; a turbine runner 24 which is coupled to an input shaft 22 of the automatic transmission 14; a stator 30 which is fixed to a housing 28, that is a non-rotating member, via a one-way clutch 26; and a lockup clutch 32 which directly connects a crank shaft 18 to the input shaft 22 via a damper (not shown). A mechanical oil pump 21 such as a gear pump is coupled to the pump impeller 20, and is driven by the engine 10 so as to rotate together with the pump impeller 20. The hydraulic pressure for shifting and lubrication is thus generated. The engine 10 is a driving force source for running of the vehicle, and the torque converter 12 is a hydrodynamic power transmission device.

The automatic transmission 14 is provided with the input shaft 22, a first planetary gear set 40, a second planetary gear set 42, a third planetary gear set 46, and an output gear 48. All the first planetary gear set 40, the second planetary gear set 42 and the third planetary gear set 46 are single pinion type. The first planetary gear set 40 and the second planetary gear set 42 are provided coaxially with the input shaft 22, and form a so-called CR-CR linked planetary gear mechanism when a carrier of the first planetary gear set 40 is coupled to a ring gear of the second planetary gear set 42, and a carrier of the second planetary gear set 42 is coupled to a ring gear of the first planetary gear set 40. The third planetary gear set 46 is provided coaxially with a counter shaft 44 which is in parallel with the input shaft 22. The output gear 48 is fixed to an end of the counter shaft 44 and is meshed with the differential gear unit 16. The elements of each of the planetary gear sets 40, 42 and 46, that is, a sun gear, the ring gear and the carrier, which rotably supports planetary gears that are meshed with the sun gear and the ring gear, are selectively coupled to each other or coupled to the input shaft 22 by four clutches C0, C1, C2, and C3, and are selectively coupled to the housing 28, which is a non-rotatable member, by three brakes B1, B2 and B3. Also, the elements of the planetary gear sets 40, 42 and 46 are coupled to each other or coupled to the housing 28 depending on a rotating direction by two one-way clutches F1 and F2. It should be noted that since the differential gear unit 16 is configured so as to be symmetric with respect to an axle, the lower portion thereof is omitted in FIG. 1.

The pair of the first planetary gear set 40 and second planetary gear set 42 which is provided coaxially with the input shaft 22, together with the clutches C0, C1, C2, the brakes B1 and B2, and the one-way clutch F1 make up a primary transmitting portion MG for four forward speeds and one reverse. The third planetary gear set 46 which is provided coaxially with the countershaft 44, together with the clutch C3, the brake B3, and the one-way clutch F2 make up a secondary transmitting portion, i.e., an under drive portion U/D. In the primary transmitting portion MG, the input shaft 22 is coupled to i) the carrier K2 of the second planetary gear set 42 via the clutch C0, ii) a sun gear S1 of the first planetary gear set 40 via the clutch C1, and iii) a sun gear S2 of the second planetary gear set 42 via the clutch C2. A ring gear R1 of the first planetary gear set 40 is coupled to the carrier K2 of the second planetary gear set 42, and a ring gear R2 of the second planetary gear set 42 is coupled to a carrier K1 of the first planetary gear set 40. The sun gear S2 of the second planetary gear set 42 is coupled to the housing 28 via the brake B1. The ring gear R1 of the first planetary gear set 40 is coupled to the housing 28 via the brake B2. The one-way clutch F1 is provided between the carrier K2 of the second planetary gear set 42 and the housing 28. A first counter gear G1, which is fixed to the carrier K1 of the first planetary gear set 40, is in mesh with a second counter gear G2, which is fixed to a ring gear R3 of the third planetary gear set 46, and power is transmitted between the primary transmitting portion MG and the under drive portion U/D. In the under drive portion U/D, a carrier K3 and the sun gear S3 of the third planetary gear set 46 are coupled together via the clutch C3. Also, in the under driver portion U/D, the brake B3 and the one-way clutch F2 are provided in parallel between the sun gear S3 and the housing 28.

The clutches C0, C1, C2, and C3 and the brakes B1, B2, B3 (hereinafter, simply referred to as "clutches C" and "brakes B", respectively, when not specified further) are hydraulic friction engaging devices, the clutches C being, for example, multi-disc clutches and the brakes B being, for example, band brakes which are controlled by hydraulic actuators. As shown in FIG. 2, these clutches C are switched between an engaged state and a disengaged state and brakes B are switched between an engaged state and a disengaged state, and each speed, i.e., five forward speeds, one reverse, or a neutral, is achieved according to a position of a shift lever (not shown). The denotations "1st" to "5th" in FIG. 2 denote the first forward speed to the fifth forward speed, respectively. In the figure, a circle indicates an engaged state, an "X" indicates a disengaged state, and a triangle indicates an engaged state which is not related to power transmission.

Figure 3:
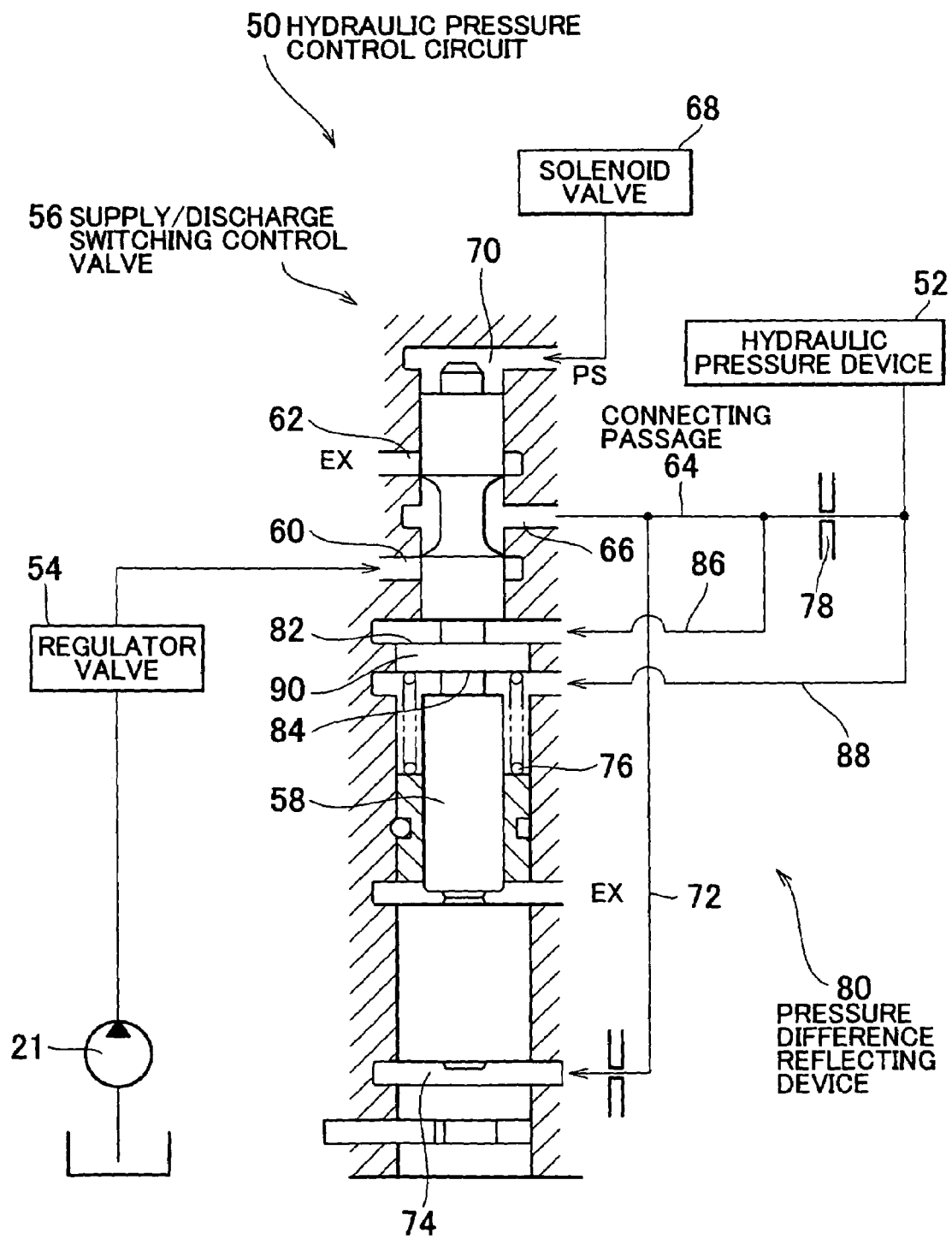
FIG. 3 is a diagram showing a hydraulic pressure control circuit as a first embodiment included in the drive-train unit for a vehicle shown in FIG. 1.

A hydraulic pressure control circuit 50 in FIG. 3 is configured to engage/apply a hydraulic pressure device 52, which is one of the clutches C and the brakes B, by supplying operating oil thereto, and to disengage/release the hydraulic pressure device 52 by discharging the operating oil therefrom. The operating oil discharged from the oil pump 21 is supplied to the hydraulic pressure device 52 through a supply/discharge switching control valve 56, after the hydraulic pressure of the operating oil is adjusted so as to be a predetermined hydraulic pressure by a regulator valve 54 according to the accelerator operating amount. The hydraulic pressure control circuit 50 corresponds to a fluid pressure control circuit, the hydraulic pressure device 52 corresponds to a fluid pressure device, and the operating oil corresponds to fluid.

The supply/discharge switching control valve 56 corresponds to a control valve. The supply/discharge switching control valve 56 includes a spool 58 which linearly reciprocates as a valve element, and further includes a supply port 60 through which the operating oil is supplied from the regulator valve 54, a discharge port 62 through which the operating oil is discharged, and a communication port 66 which is connected to the hydraulic pressure device 52 through a connecting passage 64. By moving the spool 58, the communication state among the supply port 60, the discharge port 62 and the communication port 66 is continuously changed. Namely, when the spool 58 is moved downward in FIG. 3, the circulation cross sectional area of the passage between the communication port 66 and the supply port 60 is increased, and the circulation cross sectional area of the passage between the communication port 66 and the discharge port 62 is decreased, whereby the flow rate of the operating oil to be supplied from the supply port 60 to the hydraulic pressure device 52 through the communication port 66 and the connecting passage 64 is increased. On the other hand, when the spool 58 is moved upward in FIG. 3, the circulation cross sectional area of the passage between the communication port 66 and the discharge port 62 is increased, and the circulation cross sectional area of the passage between the communication port 66 and the supply port 60 is decreased, whereby the flow rate of the operating oil to be discharged from the hydraulic pressure device 52 through the connecting passage 64, the communication port 66, and the discharge port 62 is increased.

The supply/discharge switching control valve 56 further includes a signal oil chamber 70, a feedback chamber 74, and a return spring 76. The signal oil chamber 70 urges the spool 58 downward by being supplied with a signal hydraulic pressure PS which is obtained by duty control by a solenoid valve 68. The feedback chamber 74 urges the spool 58 upward by being supplied with the hydraulic pressure in the connecting passage 64 through the feedback passage 72. The return spring 76 urges the spool 58 upward. By moving the spool 58 such that the urging force of the signal oil chamber 70, and the urging force of the feedback chamber 74 and the urging force of the return spring 76 become balanced with each other, the hydraulic pressure in the connecting passage 64, and the hydraulic pressure in the hydraulic pressure device 52 are controlled according to the signal hydraulic pressure PS. Thus, when the hydraulic pressure device 52 is engaged or disengaged during shifting, it is possible to change the hydraulic pressure thereof, that is, the engagement torque of the clutches C and the brakes B according to a predetermined change pattern, whereby shifting can be performed smoothly. Each of the supply/discharge switching control valve 56 and the solenoid valve 68 is provided for each of the hydraulic pressure devices 52. If necessary, each of the supply/discharge switching control valve 56 and the solenoid valve 68 is provided in plurality for each of the hydraulic pressure devices 52. Thus, the engagement torque of the clutches C and the engagement torque of the brakes B are controlled, respectively. The signal hydraulic pressure PS corresponds to the pressure regulating load. In the embodiment, the signal hydraulic pressure PS is controlled by the duty control by the solenoid valve 68. However, the signal hydraulic pressure PS may be controlled using a linear solenoid valve.

In such a hydraulic pressure control circuit 50, the pressure decreasing occurs due to circulation resistance of the connecting passage 64 (i.e., passage resistance) when the operating oil is being supplied to the hydraulic pressure device 52, or the operating oil is being discharged from the hydraulic pressure device 52. When the operating oil is being supplied to the hydraulic pressure device 52, the hydraulic pressure in the feedback chamber 74 exceeds the hydraulic pressure in the hydraulic pressure device 52. On the other hand, when the operating oil is being discharged from the hydraulic pressure device 52, the hydraulic pressure in the feedback chamber 74 becomes lower than the hydraulic pressure in the hydraulic pressure device 52. Therefore, in either of supply and discharge of the operating oil, the spool 58 moves in the direction in which the supply or discharge of the operating oil is restricted and the flow rate is decreased. Consequently, the time required for supply or discharge of the fluid, that is, the time required for engagement or disengagement of the hydraulic pressure device 52 is increased, and therefore the shifting responsiveness deteriorates. Particularly, in a portion in the vicinity of the hydraulic pressure device 52 in the connecting passage 64, that is, a portion which is close to the hydraulic pressure device 52 with respect to the portion at which the feedback passage 72 branches off from the connecting passage 64 in the connecting passage 64, an orifice 78 for restricting circulation of the operating oil is formed in order to suppress fluctuation in the hydraulic pressure of the operating oil in the hydraulic pressure device 52. Accordingly, deviation between the hydraulic pressure in the feedback chamber 74 and the hydraulic pressure in the hydraulic pressure device 52 during shifting is further increased, and therefore the above-mentioned problem becomes more serious.

In the first embodiment, the difference in the hydraulic pressure between the upstream side and the downstream side of the orifice 78 is detected by the pressure difference reflecting device 80, and the pressure difference load corresponding to the hydraulic pressure difference is applied to the spool 58, such that the flow rate of the operating oil is increased. When shifting is being performed and the operating oil circulates through the connecting passage 64, the hydraulic pressure becomes different between the upstream side and the downstream side of the orifice 78, according to the circulation flow rate. Therefore, when the spool 58 is moved such that as the hydraulic pressure difference increases, the flow rate of the operating oil to be supplied or to be discharged through the supply/discharge switching control valve 56 increases, the operating oil can be supplied or discharged at a sufficient flow rate, regardless of the circulation resistance of the connecting passage 64 and the decrease in the pressure due to the orifice 78.

The pressure difference reflecting device 80 includes (a) a pair of pressure difference detecting surfaces 82 and 84 provided on the spool 58 such that the hydraulic pressure is applied in opposite directions, whose pressure receiving areas are equal to each other, and (b) a pair of pressure difference detecting passages 86 and 88, the pressure difference detecting passage 86 being connected to the connecting passage 64 at a portion on the left side of the orifice 78 in FIG. 3, and introducing the operating oil circulating on the left side of the orifice 78 to the pressure difference detecting surface 82, and the pressure difference detecting passage 88 being connected to the connecting passage 64 at a portion on the right side of the orifice 78 in FIG. 3, and introducing the operating oil circulating on the right side of the orifice 78 to the pressure difference detecting surface 84. The pressure difference detecting surface 82 is formed of one end surface of a large diameter portion 90, and the pressure difference detecting surface 84 is formed of the other end surface of the large diameter portion 90. The pressure receiving surfaces of the large diameter portion which protrudes outward serve as the pressure difference detecting surfaces 82 and 84, and the pressure difference load corresponding to the hydraulic pressure difference is generated. In the first embodiment, the hydraulic pressure in the pressure difference detecting passage 86, which is close to the supply/discharge switching control valve 56 with respect to the orifice 78, is applied to the upper pressure difference detecting surface 82 so as to move the spool 58 downward, such that as the hydraulic pressure difference increases, the flow rate of the operating oil to be supplied or to be discharged through the supply/discharge switching control valve 56 increases. The hydraulic pressure in the pressure difference detecting passage 88, which is close to the hydraulic pressure device 52 with respect of the orifice 78, is applied to the lower pressure difference detecting surface 84 so as to move the spool 58 upward. Namely, when the operating oil is being supplied to the hydraulic pressure device 52, the hydraulic pressure in the pressure difference detecting passage 86 exceeds the hydraulic pressure in the pressure difference detecting passage 88. Therefore, the spool 58 is moved downward, and the circulation sectional area of the passage between the supply port 60 and the communication port 66 is increased. On the other hand, when the operating oil is being discharged from the hydraulic pressure device 52, the hydraulic pressure in the pressure difference detecting passage 88 exceeds the hydraulic pressure in the pressure difference detecting passage 86. Therefore, the spool 58 is moved downward, and the circulation cross sectional area of the passage between the discharge port 62 and the communication port 66 is increased.

With the hydraulic pressure control circuit 50 according to the embodiment, since the orifice 78 is formed in the connecting passage 64, the hydraulic pressure in the hydraulic pressure device 52 is stabilized during steady operation in which the operating oil hardly circulates through the connecting passage 64. Also, the pressure difference load corresponding to the difference in the hydraulic pressure between the upstream side and the downstream side of the orifice 78 is applied to the spool 58 of the supply/discharge switching control valve 56 by the pressure difference reflecting device 80. Accordingly, when the hydraulic pressure difference is increased when shifting is being performed and the operating oil circulates through the connecting passage 64, the spool 58 is moved according to the hydraulic pressure difference such that the flow rate of the operating oil which circulates through the supply/discharge switching control valve 56 is increased. Therefore, predetermined shifting responsiveness can be obtained. Thus, it is possible to effectively prevent an increase in the amount of the operating oil to be consumed, and deterioration of the fuel economy due to the increase in the amount of the fluid discharged from the oil pump 21, compared with the case where the shifting responsiveness in enhanced by totally increasing the flow rate, the flow rate being increased by increasing the circulation cross sectional areas of the supply port 60, the discharge port 62 and the communication port 66, the circulation sectional areas being increased by, for example, increasing the valve diameter of supply/discharge switching control valve 56 or decreasing the valve overlap amount.

In the embodiment, a pair of the pressure difference detecting surfaces 82 and 84 whose pressure receiving areas are equal to each other is formed on the spool 58, and the operating oil on the downstream side and the operating oil on the upstream side of the orifice 78 are applied to the pressure difference detecting surfaces 82 and 84 through the pressure difference detecting passages 86 and 88, respectively. Therefore, the pressure difference load is mechanically applied to the spool 58, and the device can be configured easily and at low cost. The pressure receiving areas of the pressure difference detecting surfaces 82 and 84 correspond to the pressure difference load. The pressure receiving areas of the pressure difference detecting surfaces 82 and 84 are appropriately set such that a predetermined flow rate, that is, shifting responsiveness can be obtained, in order to correspond to the amount of movement of the spool 58, that is, the increase in the flow rate.

Figure 4:
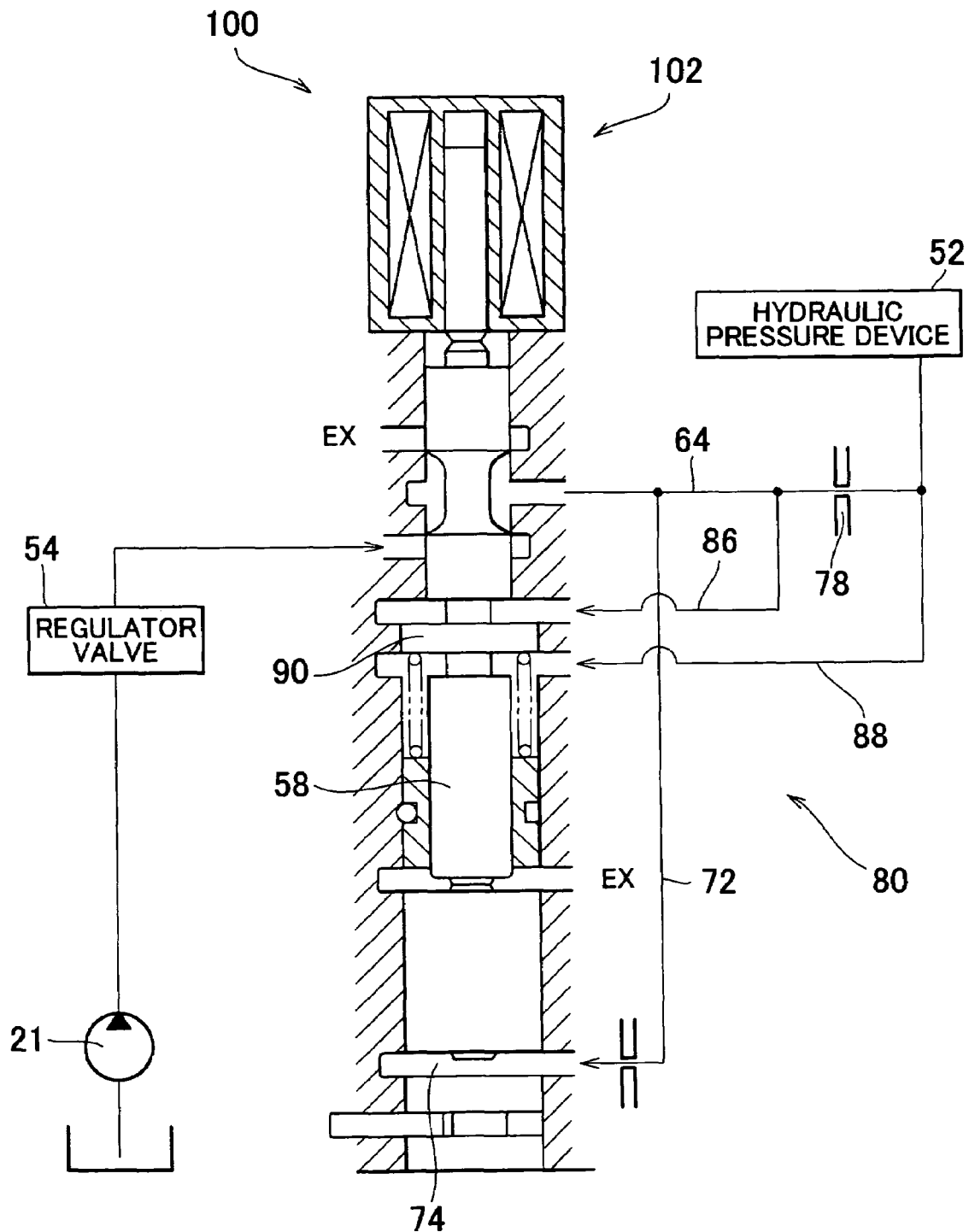
FIG. 4 is a diagram showing a second embodiment of the invention and is a diagram showing a circuit corresponding to FIG. 3.

In the supply/discharge switching control valve 56 according to the first embodiment, when the signal hydraulic pressure PS is supplied from the solenoid valve 68 to the signal oil chamber 70, the pressure regulating load is applied to the spool 58. However, in a second embodiment shown in FIG. 4, a solenoid 102 is integrally attached to a supply/discharge switching control valve 100, and the pressure regulating load is directly applied to the spool 58 due to excitation of the solenoid 102.

Figure 5:
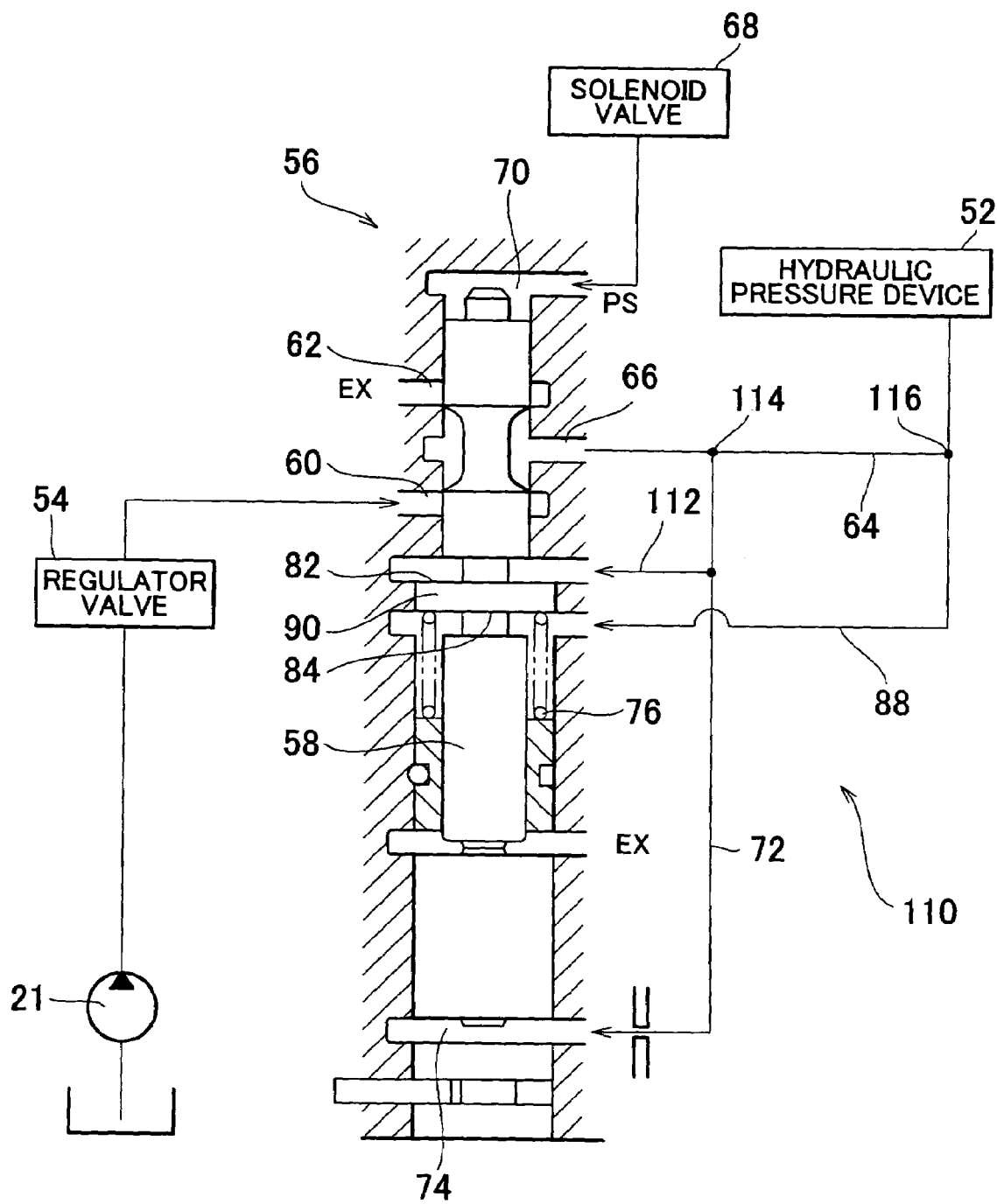
FIG. 5 is a diagram showing a third embodiment of the invention and is a diagram showing a circuit corresponding to FIG. 3.

Also, in a third embodiment shown in FIG. 5, in a pressure difference reflecting device 110, the orifice 78 and the pressure difference detecting passage 86 are not formed, a pressure difference detecting passage 112 is provided so as to branch off from the feedback passage 72, and the hydraulic pressure in the feedback passage 72 is applied to the pressure difference detecting surface 82. In this case, the hydraulic pressure difference due to the decrease in the pressure is applied to the spool 58. The decrease in the hydraulic pressure is caused between a branch point 114, at which the feedback passage 72 branches off from the connecting passage 64, and a branch point 116, at which the pressure difference detecting passage 88 branches off from the connecting passage 64, due to the circulation resistance of the connecting passage 64.

Figure 6:
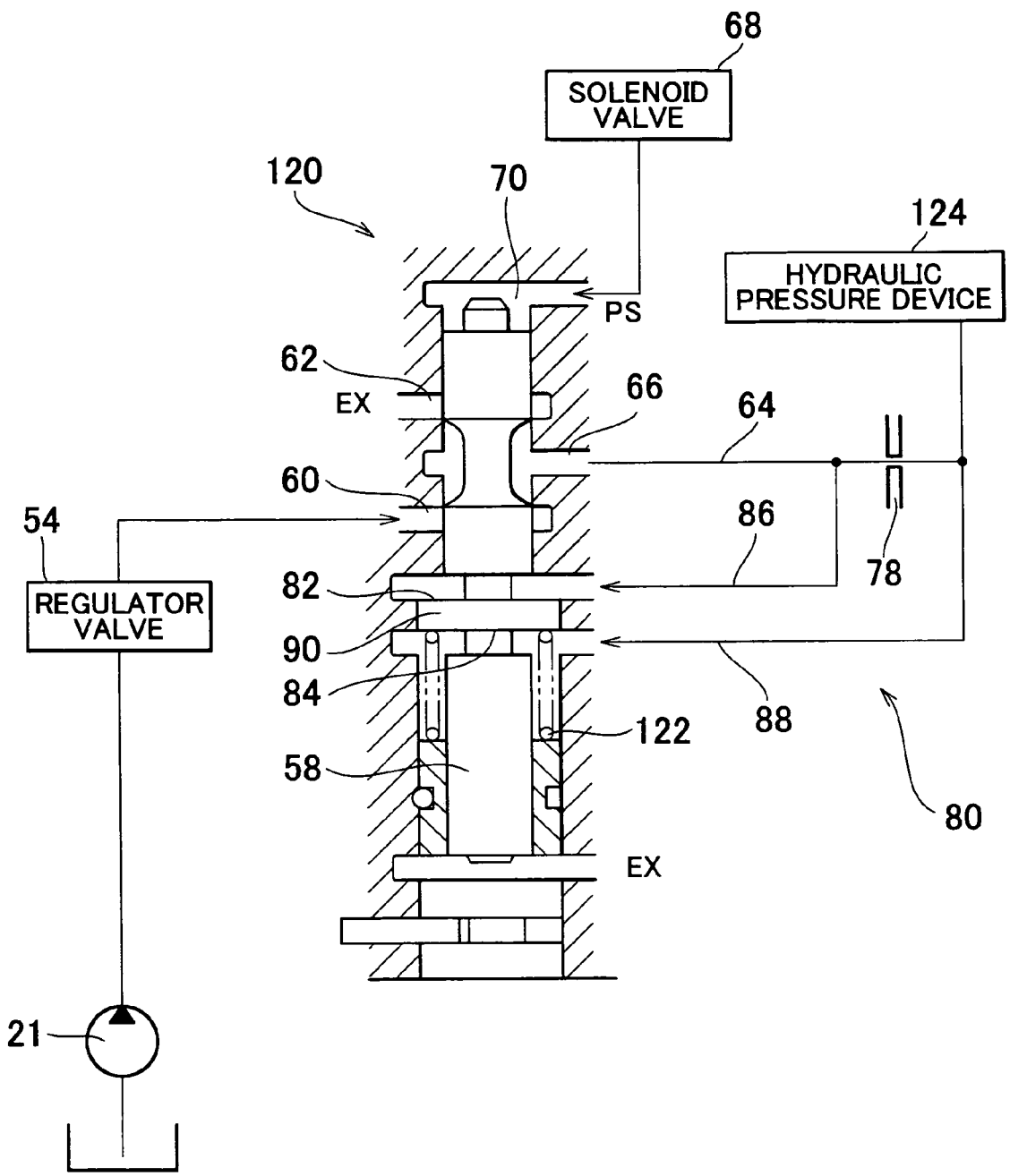
FIG. 6 is a diagram showing a fourth embodiment of the invention and is a diagram showing a circuit corresponding to FIG. 3.

Also, in a fourth embodiment shown in FIG. 6, a supply/discharge switching control valve 120 does not include the feedback chamber 74. In the steady state where the operating oil hardly circulates through the connecting passage 64, the spool 58 is held at a position at which the urging force of a spring 122 and the signal hydraulic pressure are balanced. The hydraulic pressure in a hydraulic pressure device 124 is controlled according to the position of the spool 58. When shifting is being performed and the operating oil circulates through the connecting passage 64, the spool 58 is moved such that the flow rate of the operating oil is increased, whereby the shifting responsiveness is enhanced. In this case, the hydraulic pressure device 124 is, for example, a hydraulic cylinder of an input side variable pulley for a belt type continuously variable transmission. The signal hydraulic pressure PS and the hydraulic pressure in the hydraulic pressure device 124 are controlled in a feedback manner by the solenoid valve 68 so as to achieve a desired speed ratio.

The fluid pressure control circuit according to the invention is appropriately applied to transmissions for a vehicle, such as a planetary gear type transmission in which shifting is performed according to engagement/disengagement of hydraulic friction engaging devices such as a clutch and a brake, and a belt type continuously variable transmission in which a groove width (speed ratio) and a belt clamping force of a pulley are controlled by a hydraulic cylinder. In this case, it is possible to obtain desired shifting responsiveness, by decreasing the time required for shifting without increasing the amount of the fluid to be consumed. However, the fluid pressure control circuit according to the invention can be applied to fluid pressure control circuits for mechanisms other than a transmission. Each of the hydraulic friction engaging device and the hydraulic cylinder corresponds to a fluid pressure device. The fluid pressure control circuit according to the invention can be applied not only to a fluid pressure control circuit using liquid such as operating oil, but also to various fluid pressure control circuits using gas such as air or another fluid.

The valve element of the control valve is, for example, a spool which linearly reciprocates. For example, the valve element is configured to continuously change the communication state among the supply port through which the fluid is supplied from the oil pump or the like, the discharge port through which the fluid is discharged, and the communication port to which the connecting passage is connected, the communication state being changed according to movement of the spool, the movement of the spool being determined such that the fluid pressure to be introduced through the feedback passage and the pressure regulating load are opposed to each other and then become balanced. However, as mentioned above, the feedback is not necessarily required. For example, the configuration may be employed in which the valve element is held at a predetermined supply position or a discharge position according to the relationship between the pressure regulating load and the urging force of the spring, and the valve element is moved according to the fluid pressure difference in the connecting passage, thereby changing the circulation flow rate.

The control valve may be a valve which is used when the fluid is supplied to the fluid pressure device, may be a valve which is used when the fluid is discharged from the fluid pressure device, or may be a valve which is used in both supply and discharge of the fluid.

Means for restricting circulation of the fluid is provided, for example, at a position close to the fluid pressure device with respect to the branch point at which the feedback passage branches off from the connecting passage. The means for restricting circulation causes a difference in the fluid pressure between the upstream side and the downstream side of the means for restricting circulation due to the circulation resistance according to the circulation flow rate. As in the first, second and third embodiments, an orifice which restricts the circulation cross sectional area is preferably used. However, as in the third embodiment, the means for restricting circulation such as an orifice needs not be used. The difference in the fluid pressure between predetermined two portions may be obtained in a relatively long passage in which pressure is decreased due to the circulation resistance, or in a passage whose circulation cross sectional area is relatively small. Even when the circulation cross sectional area is substantially constant, the passage between the two portions, where pressure decreases due to the circulation resistance, can be regarded as an example of the means for restricting circulation means in a broad sense.

The pressure difference reflecting device includes (a) a pair of pressure difference detecting surfaces provided on the valve element such that the fluid pressure is applied in opposite directions, whose pressure receiving areas are equal to each other, and (b) a pair of pressure difference detecting passages which are connected to two different portions in the connecting passage, such as the upstream side and the downstream side of the orifice, and which introduce the operating oil in the two different portions to the pressure difference detecting surfaces respectively. In this case, since the fluid pressure difference is mechanically applied to the valve element, the device is configured easily and at low cost. As the pressure difference detecting passage which is closer to the control valve than the other pressure difference detecting passage, for example, the feedback passage may be used.

The pressure difference reflecting device may be realized in various other embodiments. For example, a balance valve or the like which detects the fluid pressure difference may be provided in addition to the control valve, and the output pressure corresponding to the fluid pressure difference may be applied to the valve element of the control valve. Also, the fluid pressure difference may be electrically detected by a fluid pressure sensor or the like, and the pressure difference load corresponding to the fluid pressure difference may be applied to the valve element by the linear solenoid valve or the like. Various embodiments may be employed as long as the fluid pressure difference is reflected on movement of the valve element. For example, the fluid pressure difference between the two portions in the connecting passage is generated according to the circulation flow rate of the fluid. Therefore, the circulation flow rate may be detected by a flow rate sensor or the like, and the load corresponding to the circulation flow rate may be applied to the valve element by the linear solenoid valve or the like. Also, the flow rate of the fluid which circulates through the control valve may be changed by moving the valve element by a predetermined amount according to the fluid pressure difference.

Also, in the above-mentioned embodiment, the valve element is moved according to the fluid pressure difference such that as the fluid pressure difference increases, the flow rate of the fluid to be supplied or to be discharged through the control valve increases. However, various embodiments may be employed. For example, the valve element is moved according to the fluid pressure difference such that as the fluid pressure difference increases, the flow rate of the fluid to be supplied or to be discharged through the control valve decreases.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A fluid pressure control circuit, comprising:
   a fluid pressure device which is operated by a fluid pressure;
   a control valve which is connected to the fluid pressure device via a connecting passage, and which changes a flow rate of predetermined fluid that is to be supplied to the fluid pressure device or that is to be discharged from the fluid pressure device according to a position of a valve element; and
   a pressure difference reflecting device which moves the valve element based on a difference in the fluid pressure between predetermined two different portions in the connecting passage and which changes the flow rate of the fluid that is to be supplied or to be discharged through the control valve according to the fluid pressure difference;
   wherein the pressure reflecting device includes a first pressure difference detecting passage and a second pressure difference detecting passage, wherein said first pressure difference detecting passage extends from a first location along said connecting passage to the control valve, and wherein said second pressure detecting passage extends from a second location along said connecting passage to said control valve, and further wherein said first and second locations are each located along said connecting passage between the control valve and the fluid pressure device.

2. The fluid pressure control circuit according to claim 1, further comprising:
   a circulation restricting device which is provided in the connecting passage and which regulates circulation of the fluid, wherein the pressure difference reflecting device reflects the fluid pressure difference between an upstream side and a downstream side of the circulation restricting device on movement of the valve element.

3. The fluid pressure control circuit according to claim 2, wherein the circulation restricting device includes an orifice.

4. The fluid pressure control circuit according to claim 2, wherein the circulation restricting device has two portions one of which is on the upstream side thereof and the other of which is on the downstream side thereof, and a pressure difference is caused between the two portions due to circulation resistance of the fluid that circulates through the connecting passage.

5. The fluid pressure control circuit according to claim 2, wherein the pressure difference reflecting device moves the valve element according to the fluid pressure difference such that as the fluid pressure difference increases, the flow rate of the fluid that is to be supplied or to be discharged through the control valve increases.

6. A fluid pressure control circuit according to claim 1, wherein the control valve includes a supply port, a discharge port, and a communication port, wherein said communication port is connected to said connecting passage.

7. A fluid pressure control circuit according to claim 6, wherein when a pressure in said first pressure detecting passage is higher than a pressure in the second pressure detecting passage a circulation sectional area of a passage between the supply port and the communication port is increased, and wherein when the pressure in the second pressure detecting passage is higher than the pressure in the first pressure detecting passage a circulation sectional area of a passage between the discharge port and the communication port is increased.

8. A fluid pressure circuit as recited in claim 7, further including a feedback passage extending from the connecting passage to the control valve.

9. A fluid pressure circuit as recited in claim 8, wherein the feedback passage is connected to said connecting passage at said first location and wherein said first pressure detecting passage branches off from said feedback passage.

10. A fluid pressure circuit as recited in claim 8, wherein said feedback passage is connected to said connecting passage at a third location different from said first and second locations.

11. A fluid pressure circuit as recited in claim 7, wherein the control valve includes a spool which varies a communication state among the supply port, the discharge port, and the communication port, and wherein the control valve further includes means for applying a pressure regulating load to said spool to urge said spool in a first direction and a spring to urge said spool in a second direction opposite to said first direction.

12. A fluid pressure control circuit as recited in claim 11, wherein said means for applying a pressure regulation load includes a solenoid which directly applies a pressure regulating load to said spool.

13. A fluid pressure control circuit as recited in claim 11, wherein said means for applying a pressure regulating load applies a signal hydraulic pressure to said spool.

14. A fluid pressure circuit as recited in claim 1, further including a circulation restricting device between said first location and said second location.

15. A fluid pressure control circuit, comprising:
    a fluid pressure device which is operated by a fluid pressure;
    a control valve which is connected to the fluid pressure device via a connecting passage, which supplies predetermined fluid to the fluid pressure device or discharges the fluid from the fluid pressure device, and which controls the fluid pressure in the connecting passage according to a predetermined pressure regulating load by changing a flow rate of the fluid to be supplied or to be discharged, the flow rate of the fluid being changed according to movement of a valve element to which the fluid pressure in the connecting passage is applied via a feedback passage that branches off from the connecting passage, the movement of the valve element being determined based on a relationship between the fluid pressure and the predetermined pressure regulating load; and
    a pressure difference reflecting device which applies a pressure difference load corresponding to a fluid pressure difference between predetermined two different portions in the connecting passage and which changes the flow rate of the fluid that is to be supplied or to be discharged through the control valve according to the fluid pressure difference.

16. The fluid pressure control circuit according to claim 15, further comprising:

a circulation restricting device which is provided in the connecting passage and which restricts circulation of the fluid, wherein the pressure difference reflecting device reflects the fluid pressure difference between an upstream side and a downstream side of the circulation restricting device on the movement of the valve element.

17. The fluid pressure control circuit according to claim 16, wherein the circulation restricting device includes an orifice.

18. The fluid pressure control circuit according to claim 16, wherein the circulation restricting device has two portions one of which is on the upstream side thereof and the other of which is on the downstream side thereof, and a pressure difference is caused between the two portions due to circulation resistance of the fluid that circulates through the connecting passage.

19. The fluid pressure control circuit according to claim 15, wherein the pressure difference reflecting device moves the valve element according to the fluid pressure difference such that as the fluid pressure difference increases, the flow rate of the fluid that is to be supplied or to be discharged through the control valve increases.

20. A fluid pressure control circuit as recited in claim 15, wherein said control valve includes a supply port, a discharge port, and a communication port, wherein said communication port is connected to said connecting passage.

* * * * *